(12) United States Patent
Large et al.

(10) Patent No.: US 9,281,701 B2
(45) Date of Patent: Mar. 8, 2016

(54) WIRELESS POWER TRANSFER DEVICE FOR CHARGING MOBILE/PORTABLE DEVICES

(71) Applicant: ATI Technologies ULC, Markham (CA)

(72) Inventors: Yvan Large, Richmond Hill (CA); Philippe Blanchard, Markham (CA)

(73) Assignee: ATI Technologies ULC, Ontario (CA)

( * ) Notice: Subject to any disclaimer, the term of this patent is extended or adjusted under 35 U.S.C. 154(b) by 541 days.

(21) Appl. No.: 13/679,626

(22) Filed: Nov. 16, 2012

(65) Prior Publication Data

US 2014/0139178 A1 May 22, 2014

(51) Int. Cl.
*H01M 10/44* (2006.01)
*H01M 10/46* (2006.01)
*H02J 7/00* (2006.01)
*H02J 7/02* (2006.01)

(52) U.S. Cl.
CPC .............. *H02J 7/0044* (2013.01); *H02J 7/025* (2013.01); *Y02B 40/90* (2013.01)

(58) Field of Classification Search
CPC ......... H02J 5/005; H02J 7/025; H02J 7/0042; H02J 7/0044
USPC ........ 320/107, 108, 114, 115; 336/15, 65, 90, 336/110, 130, 131
See application file for complete search history.

(56) References Cited

U.S. PATENT DOCUMENTS

| | | | |
|---|---|---|---|
| 5,070,293 A * | 12/1991 | Ishii et al. ...................... | 320/108 |
| 5,216,402 A * | 6/1993 | Carosa .............................. | 336/66 |
| 5,719,418 A * | 2/1998 | Jeng et al. ...................... | 257/303 |
| 5,909,100 A * | 6/1999 | Watanabe et al. ............. | 320/108 |
| 7,013,163 B2 | 3/2006 | Jaggers et al. | |
| 7,502,225 B2 | 3/2009 | Solomon et al. | |
| 7,679,902 B2 | 3/2010 | Thompson | |
| 7,715,187 B2 | 5/2010 | Hotelling et al. | |
| 7,916,467 B2 | 3/2011 | Hotelling et al. | |
| 7,940,522 B2 | 5/2011 | Solomon et al. | |
| 8,164,222 B2 | 4/2012 | Baarman | |
| 2009/0238342 A1 | 9/2009 | Bettouyashiki et al. | |
| 2009/0278495 A1 | 11/2009 | Kaye et al. | |
| 2010/0123430 A1 | 5/2010 | Kojima et al. | |
| 2011/0084657 A1 | 4/2011 | Toya et al. | |
| 2011/0134600 A1 | 6/2011 | Pine | |

* cited by examiner

*Primary Examiner* — Edward Tso
(74) *Attorney, Agent, or Firm* — Volpe and Koenig, P.C.

(57) ABSTRACT

A charging system having a charging device with a groove for receiving a mobile/portable device for charging is provided having a magnetic core located in a housing of the charging device with the magnetic core having a base and two legs that are located around the groove. A coil is wrapped around the base and a driver circuit is connected to the coil as well as to an external power source. A power receiver is located in a mobile/portable device that can be placed in the groove in the charging device. The power receiver includes a receiver magnetic core as well as a receiving coil wrapped around the receiver magnetic core for receiving an inductive current from the charging device. A charging circuit is connected to the receiving coil and adapted to be connected to the battery of the mobile/portable device for charging.

35 Claims, 7 Drawing Sheets

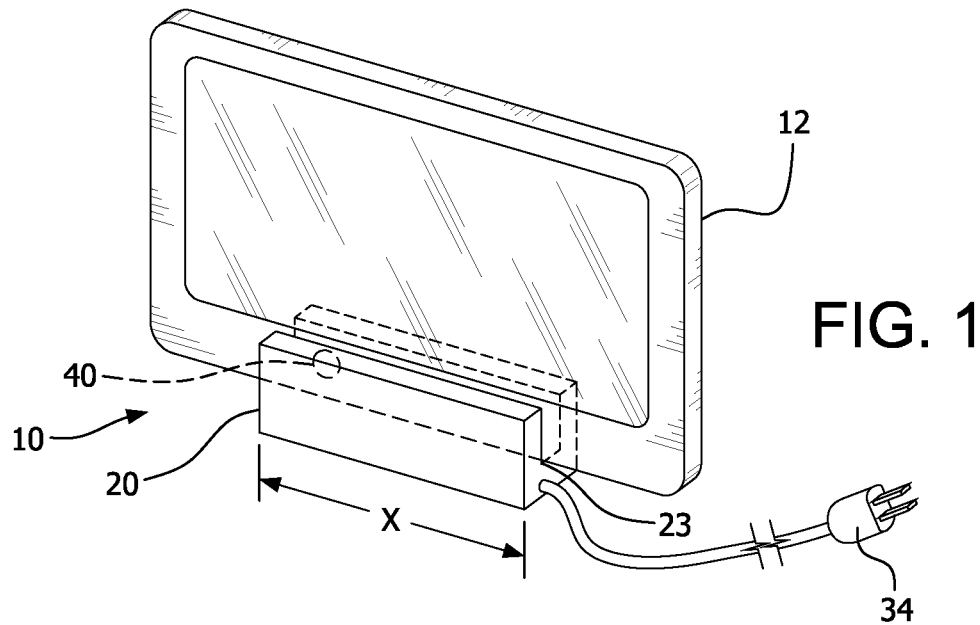
FIG. 1
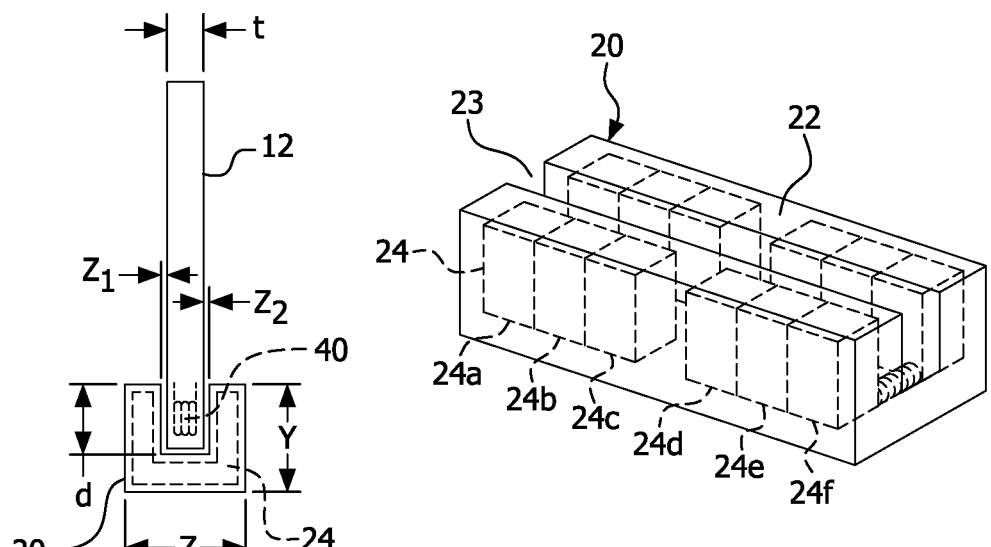
FIG. 2A
FIG. 3

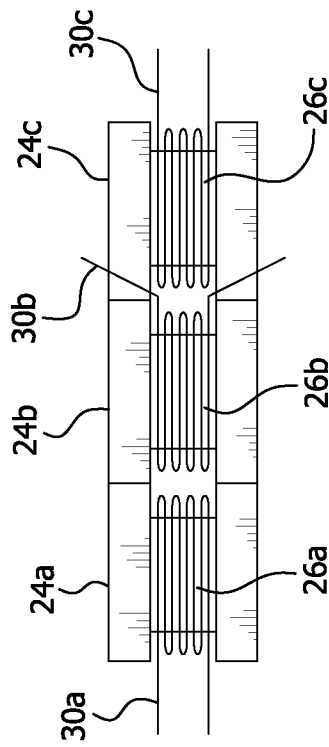
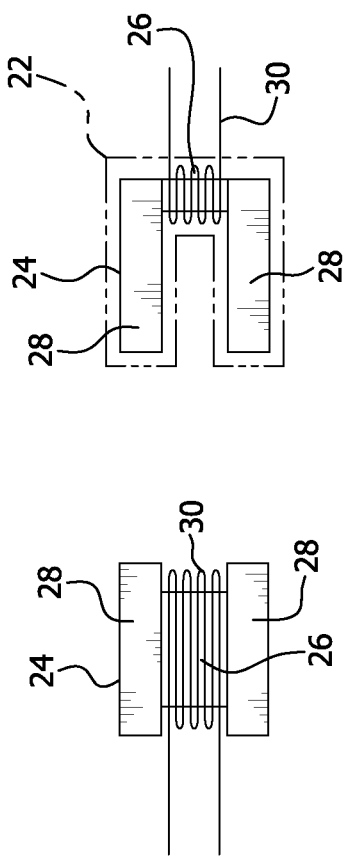
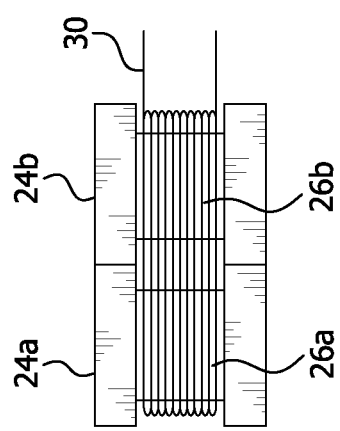
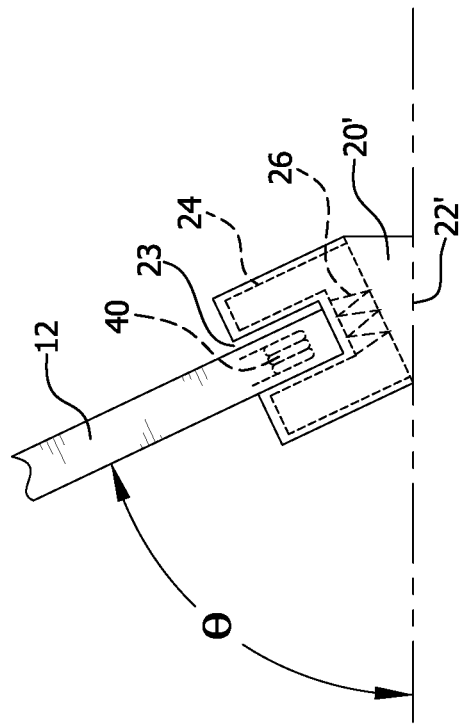

WIRELESS POWER TRANSFER DEVICE FOR CHARGING MOBILE/PORTABLE DEVICES

BACKGROUND

The invention is directed to a wireless or non-contact power transfer device for charging mobile/portable devices and a wireless mobile/portable device charging system.

Wireless power transfer systems are available for charging mobile phone and other portable devices; however, there are limitations with respect to the known arrangements. For instance, in one known non-contact power transfer device used in connection with mobile phones, the device to be charged is placed in a cradle having a power transfer coil located at the base of the cradle and a power receiving coil located in the device to be charged. The cradle holds the device in a fixed position so that the power transmission coil as well as the power receiving coil are aligned with one another. This arrangement does not allow for universal use as the cradle is specifically adapted to the geometry of the particular mobile phone.

In another known wireless charging system for a portable electronic device, multiple different coil arrangements are provided on a flat side of a cradle. This is disclosed as allowing different devices to be positioned such that at least one of the primary induction coils in the power supply cradle is generally aligned with a receiving coil in a device to be charged. This arrangement however does not provide for efficient power transfer depending upon whether or not a device to be charged is placed in close proximity to one of the multiple coils provided in the charging station.

In another known device, a docking station is provided for inductive charging of a portable electronic device. However, in order to allow the device to be charged in multiple different positions, the docking station is configured to mechanically hold the device in one of several positions so that the induction coil in the docking station aligns with the receiving coil in the device to be charged.

Other charging systems require the alignment and insertion of a specific charging connector or contact between exposed conductors of a charging cradle with exposed conductors in the device to be charged.

In addition to the issues noted above, none of the known non-contact or wireless power transfer devices are inherently suitable to the geometry typical of tablet-type computing devices due to the thickness of the tablet and/or required power receiver.

SUMMARY OF EMBODIMENTS OF THE INVENTION

In one embodiment, a wireless or non-contact mobile/portable device charging system is provided. The charging system includes a charging device with a housing having a groove for receiving the mobile/portable device for charging. A magnetic core is located in the housing. The magnetic core has a base and two legs that are located around the groove in the housing. A coil is wrapped around the base, and a driver circuit is connected to the coil and to an external power source. A power receiver is adapted to be located on the mobile/portable device in an area that is engagable in the groove of the charging device. The power receiver includes a receiver magnetic core, a receiving coil wrapped around the receiver magnetic core for receiving an inductive current, and a charging circuit connected to the receiving coil and adapted to be connected to a battery of the mobile/portable device. This allows for wireless charging, and could also allow for the possibility of live operation of the mobile/portable device, bypassing the battery.

This arrangement allows one or more power receivers to be placed in a bezel along one or more edges of a mobile/portable device, such as a tablet-type computing device, so that it does not interfere with the rest of the mechanical arrangement of the device or affect the device thickness. In a preferred arrangement, one or more power receivers are located in a bezel around the periphery of the mobile/portable device, such as the bezel of a table-style computing device so that it does not interfere with the large surface area occupied by the battery or the thickness of the device. The power receivers can be located along one or more sides of the mobile/portable device to allow placement in the charging device in any desired orientation.

Further, in an embodiment of the invention the longitudinal ends of the groove in the housing are open allowing the mobile/portable device to be placed in any position along the groove and, in the case of a tablet-style computing device, to allow the ends of the tablet-style computing device to extend out of the longitudinal ends of the charging device housing. Alternatively, the charging device housing can be sized such that the groove is long enough to encompass an entire side edge of the mobile/portable device.

In one embodiment of the charging device, the magnetic core comprises a plurality of magnetic cores located in the housing which can be located adjacent to one another, in separate groupings, or a combination of adjacent and spaced apart magnetic cores. A plurality of coils can be provided with a separate one of the coils wrapped around the base of each of the magnetic cores. Here it is beneficial if a plurality of driver circuits are provided and a separate one of the driver circuits is connected to each of the coils.

In a further embodiment, the driver circuits are configured to be powered in turn in order to detect the location of the power receiver in a mobile/portable device placed in the charging device based on a load being detected at the location of the power receiver in the groove. This allows the charging device to more efficiently transfer power to the mobile/portable device being charged once the location of the power receiver has been identified. Alternatively, it is possible for one or more of the magnetic cores extending along the longitudinal length of the groove to all be powered. It is also possible for the coil to be wrapped around the bases of more than one of the magnetic cores in order to establish charging zones that extend for a longitudinal distance greater than a single magnetic core.

In another embodiment, several of the power receivers are located in the mobile/portable device. Each of the power receivers is adapted to receive an inductive current from the charging device. The power receivers can be located along one or more of the side edges of the mobile/portable device to allow it to be placed in the charging device in any desired orientation. Here, it is possible in connection with the driver circuits that are configured to detect a location of one or more power receivers based on the load detected at the specific power receiver locations, that only the driver circuits associated with the magnetic cores in the area of the power receivers present are driven in order to provide more efficient charging.

In another aspect, a total clearance between both faces of the mobile/portable device and the groove is less than 0.1 inches in order to provide for more efficient power transfer.

Further, it is preferred that the depth of the groove is less than a distance from a side of the mobile/portable device to a display screen on the mobile/portable device in order to allow the device to be used when in the charging device.

In another aspect of the invention, the magnetic core and the receiver magnetic core that are used in connection with the coil in the charging device and the receiving coil concentrate the magnetic field created by the coil to provide more efficient power transfer to the receiving coil. This allows for more efficient power transfer and/or a reduced size of the components required.

In another embodiment, a wireless charging device adapted to charge a mobile/portable device including an inductive power receiver is provided. The charging device includes a housing that has a groove for receiving the mobile/portable device for charging. A magnetic core is located in the housing, with the magnetic core having a base and two legs that are located around the groove. A coil is wrapped around the base of the magnetic core for generating an inductive magnetic field. A driver circuit is connected to the coil and to an external power source. This charging device is used to charge a mobile/portable device that includes a power receiver adapted for inductive charging. The power receiver can be a receiving coil with or without a receiver magnetic core.

In another aspect, it is possible for the magnetic core to comprise a plurality of magnetic cores with a plurality of coils also being provided such that a separate one of the coils is wrapped around the base of each of the magnetic cores. Here, it is also possible to provide a plurality of the driver circuits such that a separate one of the driver circuits is connected to each of the coils. Alternatively, a single coil can encompass a plurality of the magnetic cores. Here, depending upon the specific configuration of the coils and the driver circuits, the driver circuits can be configured to be powered in turn in order to detect the location of the power receiver based on the load being detected at a location of a power receiver in the groove, and then charging can be carried out by only powering the driver circuit for the magnetic core and coil in the detected location in order to provide for more efficient charging.

In another embodiment, a method for wirelessly charging a mobile/portable device is provided that includes an inductive power receiver. The method includes providing a charging device having a housing that has a groove for receiving the mobile/portable device for charging, a magnetic core that has a base and two legs is located around the groove, and a coil is wrapped around the base of the magnetic core for generating an inductive magnetic field. A driver circuit is connected to the core and to an external power source. A mobile/portable device including a power receiver is placed in the groove of the charging device so that the power receiver is located in the groove. The power receiver includes a receiver magnetic core, a receiving coil wrapped around the receiver magnetic core for receiving an inductive current, and a charging circuit connected to the receiving coil and to a battery of the mobile/portable device. Here, the mobile/portable device is positionable anywhere along the groove. The battery is charged via an inductive charge generated in the receiving coil from the charging device. A plurality of power receivers could also be provided.

Here, more efficient power transfer is accomplished with a small geometry due to the concentration of the inductive magnetic field via the magnetic core in the charging device as well as the receiver magnetic core in the power receiver.

In another aspect, a universal charger is provided based on a standard thickness of a mobile/portable device having a pancake-shaped configuration with the groove in the charging device being adapted to the thickness of the mobile/portable device. Different charging devices with grooves adapted to different standard thicknesses of mobile/portable devices can be provided. This allows various different types of mobile/portable devices configured with a power receiver to be charged with an efficient, compact, low cost charging device.

In another aspect, multiple mobile/portable devices can be placed in the groove of the charging device and charge simultaneously.

Further aspects of the invention which can be adapted for use either separately or in various combinations based on the features noted above and described in further detail below and in the claims are also possible.

BRIEF DESCRIPTION OF THE DRAWINGS

The foregoing summary as well as the following detailed description will be best understood when read in conjunction with the appended drawings. In the drawings:

FIG. 1 is a perspective view of a charging system in accordance with a preferred embodiment of the present invention.

FIG. 2A is a side view of the charging system of FIG. 1.

FIG. 2B is a side view similar to FIG. 2A in which the charging system is angled to allow for easier use of the device while charging.

FIG. 3 is a perspective view of the charging device with a plurality of magnetic cores located inside the charging device housing.

FIG. 4 is a top view of a single magnetic core with associated coil.

FIG. 5 is a side view of the magnetic core shown in FIG. 4.

FIG. 6 is a top view of two magnetic cores located side by side having respective separate coils.

FIG. 7 is a top view of two coils located side by side in which the bases of the magnetic cores are encompassed by a single coil.

DETAILED DESCRIPTION OF THE PREFERRED EMBODIMENTS

Figures 8A, 8B, 8C:
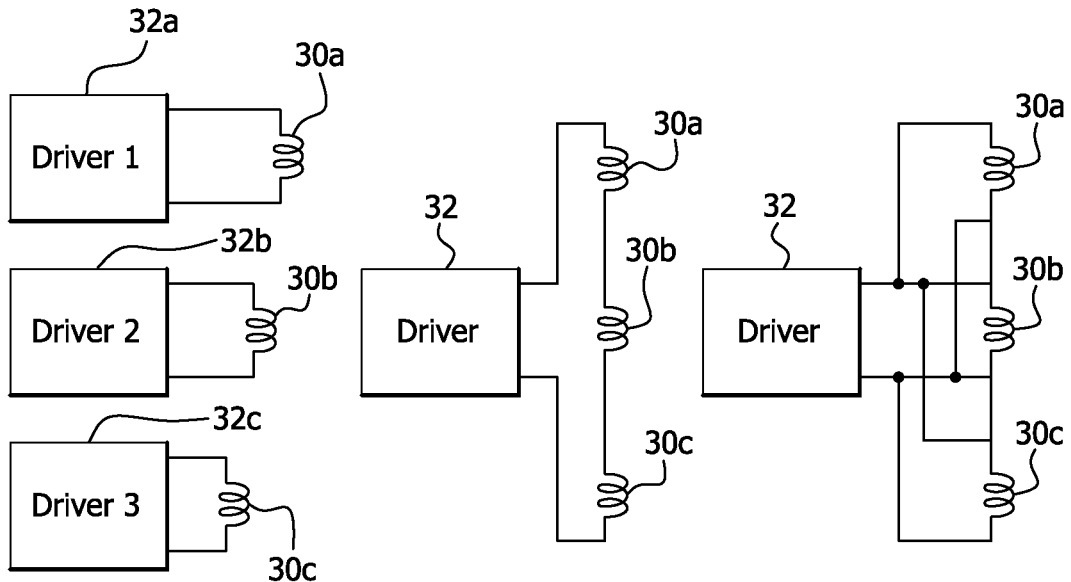
FIG. 8A is a schematic diagram showing three drivers for powering three separate coils in the charging device.
FIG. 8B is a schematic diagram showing a single driver for powering three coils connected in series in the charging device.
FIG. 8C is a schematic diagram showing a driver for three coils connected in parallel in the charging device.

As used herein, the terms "a" and "one" refer to one or more of the referenced item unless expressly indicated otherwise. Additionally, a "mobile/portable device" is intended to refer to any mobile telephone, PDA, tablet-type computer, or other device having an internal battery which requires charging or which requires a wireless power transmitter for live operation, with or without battery charging.

Briefly summarized, the charging system 10 includes a charging device 20 with a housing 22 having a groove 23 for receiving a mobile/portable device 12 for charging. A magnetic core 24 is located in the housing 22, with the magnetic core 24 having a base 26 and two legs 28 that are located around the groove 23. A coil 30 is wrapped around the base 26, and a driver circuit 32 is connected to the coil 30 as well as to an external power source. A power receiver 40 is located in a mobile/portable device 12 that is placed so that the power receiver 40 is in the groove 23. The power receiver 40 includes a receiver magnetic core 46 as well as a receiving coil 48 wrapped around the receiver magnetic core 46 for receiving an inductive current from the charging device 20. A charging circuit 50 is connected to the receiving coil 48 and adapted to be connected to the battery 54 of the mobile/portable device 12 for charging.

Referring to FIG. 1, a charging system 10 for wireless charging of a mobile/portable device 12 is shown. The charging system 10 includes a charging device 20 having a housing 22 with the groove 23 defined therein. The groove 23 is adapted to receive the mobile/portable device 12 for charging. In a preferred embodiment of the charging device 20, the longitudinal ends of the groove 23 in the housing 22 are open so that, for example, a tablet-style computing device can be set in the groove 23 and protrude from either side of the charging device 20.

As shown in detail in FIGS. 2A and 3, a magnetic core, generally indicated as 24 is located in the housing 22. A single core 24 can be provided or a plurality of cores, for example 24a-24f in FIG. 3 or 24a-24h in FIG. 9, can be provided. These cores 24 are preferably made of a ferrite material. The magnetic core 24, 24a-h, has a base 26 as well as two legs 28 that are located around the groove 23, as shown in FIGS. 2A and 3. In one preferred embodiment, each of the individual cores 24a-24h has a height (Y) of 1.0 inches and a depth (Z) of 0.8 inches, and each core 24a-24h has a width in the longitudinal direction of the groove 23 of approximately 0.5 inches. The width of the groove, shown in FIG. 2A, is preferably adapted to the mobile/portable device 12 along with a clearance, indicated as $Z_1$ and $Z_2$ in FIG. 2A. In one application, the thickness t of the mobile/portable device is 0.4 inches and the dimension $Z_1$ and $Z_2$ each equal 0.05 inches so that the groove has a width of approximately 0.5 inches in order to accommodate a mobile/portable device 12 having a thickness t=0.4 inches with some clearance. Those skilled in the art will understand that these dimensions are merely exemplary and that other dimensions for the groove, the height and depth of the core, as well as the thickness of the mobile/portable device 12 are possible. While it is preferred in order to achieve an efficient power transfer that a total clearance between both faces of the mobile/portable device 12 and the groove 23 is less than 0.1 inches, a greater clearance can be provided although this would result in a less efficient power transfer.

Still with reference to FIG. 2A, the groove preferably has a depth d which is designed to hold the mobile/portable device 12 in a position where the display screen on the mobile/portable device 12 is unobstructed. Accordingly, a depth d of the groove is preferably less than a distance from a side of the mobile/portable device 12 to the display screen.

Referring to FIG. 2B, an alternate embodiment of the charging device 20' is shown that includes the housing 22'. This embodiment of the charging device 20' is the same as the embodiment 20 discussed above except the housing has been modified so that the groove 23 is arranged at an acute angle θ relative to a base upon which the charging device 20' rests. This positions the mobile/portable device 12 that is located in the groove at an easier angle for a user to continue using the mobile/portable device 12 while it is charging in the charging device 20'. Alternatively, the charging device 20, 20' could be use for live operation of the mobile/portable device 12. The angle θ is preferably in the range of 50° to 80°. However, greater or smaller angles could be used depending on the particular application.

Preferably, the base or bases 26 of the core or cores 24, 24a-h are wrapped with a coil 30 which acts as an inductor. The coil 30 is connected to a driver circuit 32, for example as shown in FIGS. 8A-8C, in order to provide power to the coil 30 for inductive charging. The driver circuit 32 is also connected to an external power source represented in FIG. 1 via the plug 34.

As shown in FIGS. 4 and 5, on one embodiment, the coil 30 preferably extends around the base 26 of the core 24. In the event that the magnetic cores are provided as several separate cores 24a-24f as shown in FIG. 3, it is also possible to provide separate coils 30, for example 30a-30c in FIG. 6, that separately wrap around the respective bases 26a, 26b, 26c of each of the magnetic cores 24a-24c. Here, for example, a plurality of driver circuits 32 can be provided such as 32a, 32b, 32c shown in FIG. 8A, and each of these driver circuits 32a-32c is connected to a separate one of the coils 30a-30c. It is also possible, as shown in FIG. 7, to have a single coil 30 encompass more than one of the bases 26 of a plurality of magnetic cores 24. For example, in FIG. 7, a single coil 30 encompasses the bases of both magnetic cores 24a and 24b. It is thus possible, for example, with respect to FIG. 3, to have a single coil 30a encompassing the magnetic cores 24a, 24b and 24c and a second separate coil 30b encompassing the magnetic cores 24d, 24e and 24f. Alternatively, each of the magnetic cores, 24a-24f could have a base that is encompassed by its own individual coil 30. Those skilled in the art will recognize that various combinations of coils 30 and driver circuits 32 can be provided depending upon the specific configuration for the charging device 20 for a particular application.

In the event that at least two separate driver circuits 32a, 32b are provided, it is preferred that the driver circuits are configured to detect a location of a power receiver 40 located in the mobile/portable device 12 (described in detail below) by powering the driver circuits 32 in turn and detecting a charging load at a location of the power receiver 40 in the groove 23. The driver circuit 32 for the coil 30 of the specific magnetic core 24 in proximity to the power receiver 40 is then powered in order to charge the battery in the device 12.

A controller (not shown) can be associated with the driver circuits to monitor and control the switching of and on of the driver circuits 32.

The housing 22 is preferably made of a polymeric material, and can be a molded part. It can also be made out of other materials, if desired.

Figure 9:
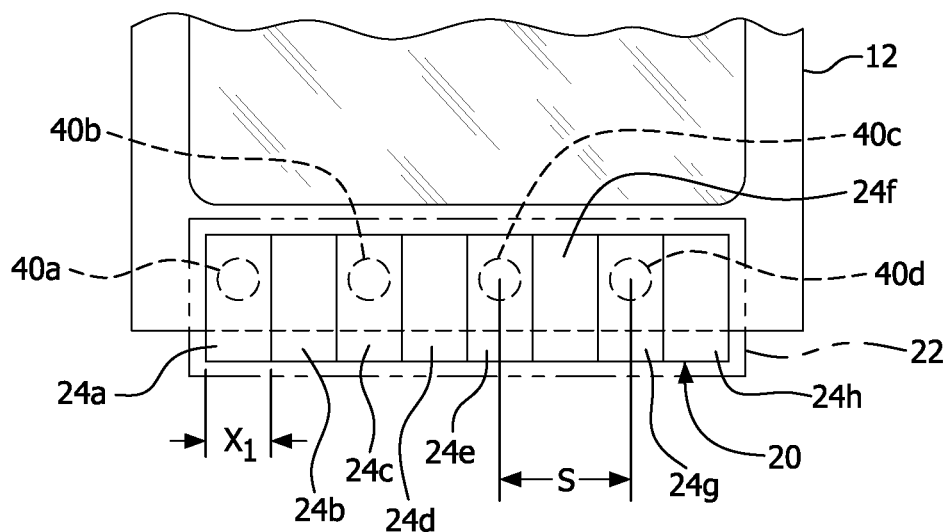
FIG. 9 is a partial front elevational view of a charging device in accordance with an embodiment of the invention having a plurality of magnetic cores illustrated charging a mobile/portable device having a plurality of power receivers.
Figure 10:
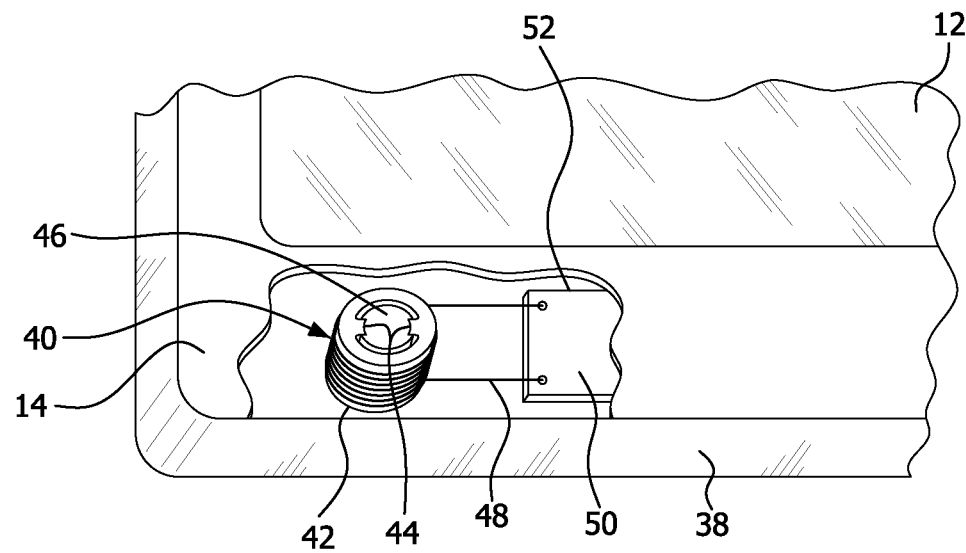
FIG. 10 is an enlarged perspective view, partially broken away, of a mobile/portable device having a power receiver.
Figure 11:
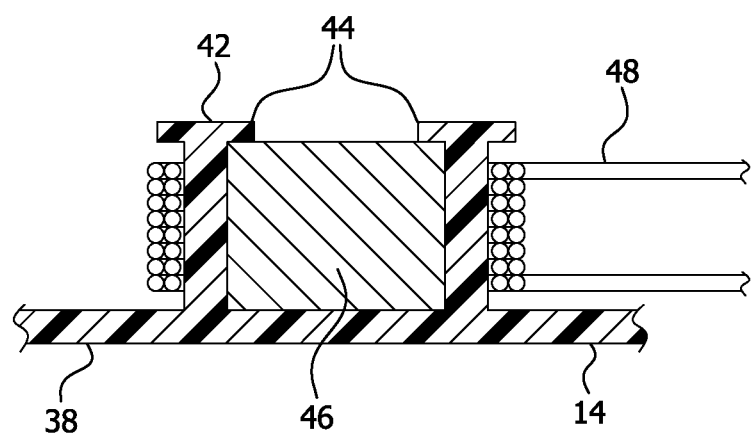
FIG. 11 is a cross-sectional view through the power receiver shown in FIG. 10.

Referring to FIGS. 1, 2, and 9-11, a power receiver 40 is shown that is adapted to be located on the mobile/portable device 12 in an area that is engagable in the groove 23 of the charging device 20. The power receiver 40 includes a receiver magnetic core 46 as well as a receiving coil 48 wrapped around the receiver magnetic core 46 for receiving an inductive current. A charging circuit 50 is connected to the receiving coil 48 and the charging circuit 50 is adapted to be connected to a battery 54 (shown in FIG. 12) of the mobile/portable device 12. As shown in FIGS. 1 and 2, the depth d of the groove 23 in the charging device 20 is sufficient so that the legs 26 of the magnetic core 24 of the charging device 20 encompass the power receiver 40 located in the mobile/portable device 12. As shown in detail in FIGS. 2 and 11, the receiver magnetic core 46 is preferably a rod having a height that is less than a thickness t of the mobile/portable device 12 that is adapted to be located in the mobile/portable device 12 along one of the sides that is positionable in the groove 23. Preferably, the receiver magnetic core 46 is located in a bezel 14 of the mobile/portable device 12. In one preferred arrangement, as shown in FIGS. 10 and 11, the bezel 14 includes a molded core holder 42 having snap engagement tabs 44 for holding the receiver magnetic core in position, and the receiving coil 48 is wrapped around the core holder 42.

Preferably the bezel 14 of the mobile/portable device 12 is made of a polymeric material and the core holder 42 with the snap tabs 44 are preferably molded together with the bezel 14. However, other arrangements for installing a receiver magnetic core 46 with an associated receiving coil 48 wrapped around it are possible. For example, separate spool parts similar to the core holder 42 made of a polymeric material having a receiver magnetic core 46 pressed in the center of the spool and the receiving coil 48 wrapped around the outside could be pre-assembled and then separately bonded or fastened in the desired locations around part or all of an inside periphery of a mobile/portable device housing.

For a separate coil 30 for each of the cores 24*a-h* or if multiple groupings of cores for example 24*a-24c* and 24*d-24f* as shown in FIG. 3 have there own individual coils, the respective driver circuits 32*a*, 32*b*, 32*c*, etc. can be independently driven in turn in order to detect the position of the power receiver inside the mobile/portable device 12 and then only the particular driver circuit 32*a*, 32*b*, 32*c* for the core 24 or grouping of cores 24*a-24f* that is aligned properly with the power receiver 40 is driven in order to reduce losses.

Referring now to FIG. 9, an exemplary embodiment of the invention is shown where here the charging device 20 includes cores 24*a-24h* located in the housing 22, each having an individual coil 30 (not shown in FIG. 9) that is driven by a separate respective driver circuit 32. In this case, an array of power receivers 40*a-40d* are provided in the mobile/portable device 12. The receiver magnetic cores 46 of the power receivers 40*a-40d* preferably each have a diameter that is less than a width of the magnetic cores 24*a-24h* in a longitudinal direction of the groove 23. Preferably, the driver circuits 32 associated with each of the magnetic cores 24*a-24h* is powered in turn independently of the other driver circuits in order to detect the locations of the power receivers 40*a-40d* in the mobile/portable device 12. Only the particular driver circuits 32 for the aligned magnetic cores 24*a*, 24*c*, 24*e* and 24*g* are then driven. Here, the power receivers 40*a-40d* are each connected to the charging circuit 50 of the mobile/portable device 12.

Other similar arrangements are possible with coils 30 assigned to groups of magnetic cores 24 (such as shown in FIG. 3). The use of the separate magnetic cores 24 allows for a modularized expansion using the same parts for differently sized charging devices 20.

Referring again to FIG. 9, it would also be possible for the groove 23 in this case to receive a plurality of mobile/portable devices 12 for simultaneous charging of the mobile/portable devices depending a width of each of the mobile/portable devices. For example, two or three PDAs or mobile phones could be inserted in the groove 23 of the charging device 20 and the power receiver 40 in each of these devices detected and then only those cores 24*a-24h* in proximity to the power receivers 40 of the devices being charged being driven.

Figure 13A:
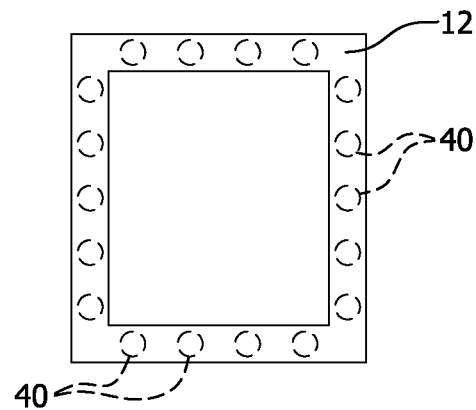
FIGS. 13a-13c are front views of exemplary mobile/portable devices showing alternative arrangements of the power receivers.
Figure 13B:
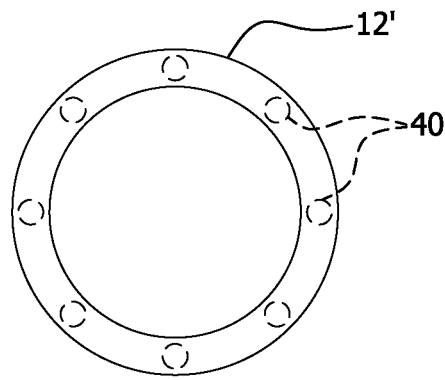
Figure 13C:
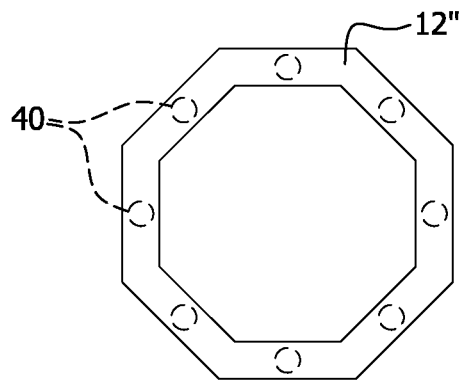

As shown in FIGS. 13*a-13c*, the power receivers 40 can be located along each of the edges of variously shaped mobile/portable devices 12, 12', 12" so that such devices can be placed in the groove 23 of a charging device 20 for charging the battery without regard to a particular orientation or position. The shapes of the mobile/portable devices 12, 12', 12" shown are intended to be merely exemplary.

Figure 12:
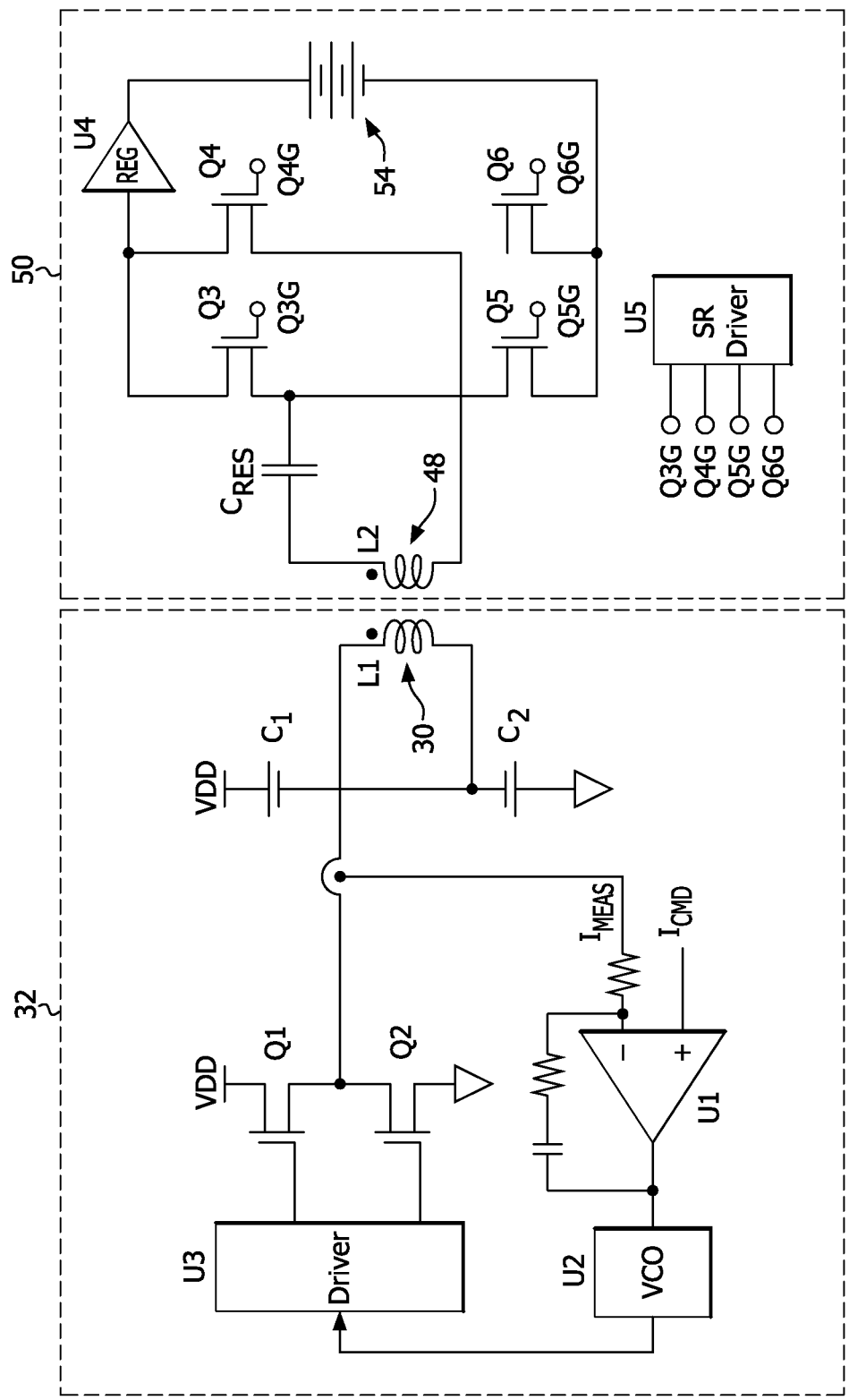
FIG. 12 is a schematic diagram showing one preferred driver circuit and one preferred charging circuit in an embodiment of the charging system according to the invention.

Referring to FIG. 12, an exemplary driving circuit 32 along with an exemplary charging circuit 50 is shown. Here the driving circuit 32 is a series resistant power converter which can efficiently transfer power despite the potential for a poor magnetic coupling co-efficient of the wireless connection. A half-bridge implementation is shown with switches Q1 and Q2 possibly operating in the 100 kHz to 10 MHz range which are operated in such a way to regulate the primary current in the coil 30. A regulator U1 controls a voltage controlled oscillator VCO in order to achieve primary current regulation on the charging device side, depending upon the battery capability. In the charging circuit 50, a capacitor $C_{res}$ partially cancels leakage inductance of the proposed power transfer arrangement. A self-driven synchronous rectifier U5 drives the rectification bridge made of switches Q3 through Q6 in order to convert the incoming AC power to DC power for charging the battery 54. A regulator U4 can be provided to post regulate the voltage supply to the battery. On the driver circuit side 32, it is also possible to provide capacitors C1 and C2 with a value selected to assist the capacitor $C_{res}$ in the cancellation of the leakage inductance of the power transformer formed by the coil 30 and the receiving coil 48.

The charging device 20 allows a user to place a mobile/portable device 12 into the groove 23 with relatively relaxed mechanical tolerances such that a user can simply drop the mobile/portable device 12 onto the charging device 20 to provide for charging power transfer without further intervention from the user.

According to another aspect of the invention, the charging device 20 which is adapted to charge the mobile/portable device 12 is provided as a separate stand alone item which can be provided to consumers having mobile/portable devices 12 that are supplied with a power receiver 40. The charging device 20 is as described above and the power receiver 40 is preferably as also described above although other configurations without a magnetic core may also be possible.

Figure 14:
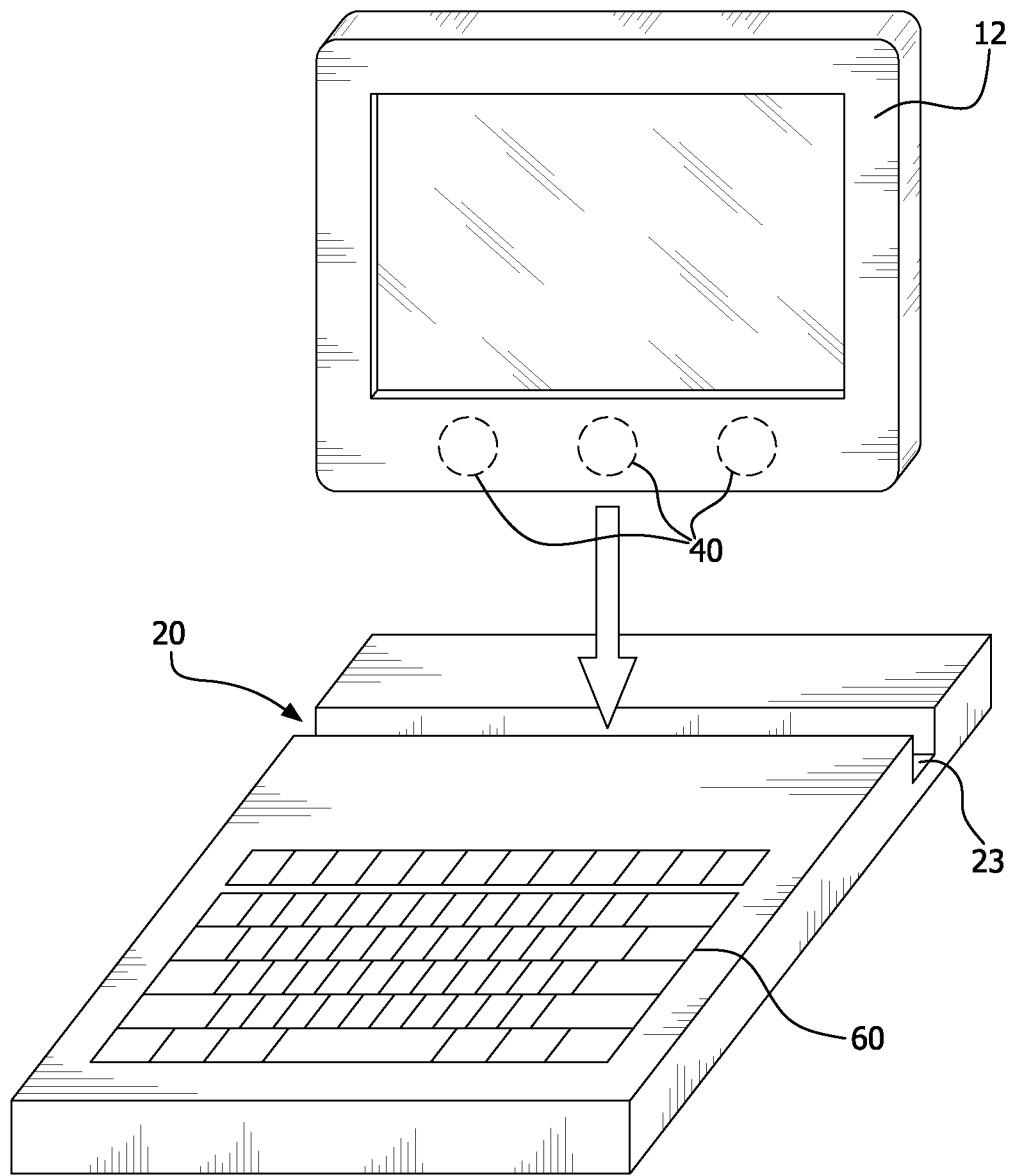
FIG. 14 is a perspective view of the charging system incorporated into a keyboard of a mobile computer.

For example, as shown in FIG. 14, the charging device 20 can be provided as part of an external keyboard 60 for a tablet or mobile computing device 12. The keyboard 60 includes a groove 23 that holds the mobile computing device 12 in a position that allows the screen to be viewed by the user while using the keyboard 60. This allows wireless charging while the tablet or mobile computing device 12 is being used in connection with the keyboard 60, or when the device 12 is not in use.

A method for wirelessly charging a mobile/portable device 12 that includes an inductive power receiver 40 is also provided. Here, a charging device 20 having a housing 22 with a groove 23 as described above is provided. The charging device 20 includes one or more magnetic cores 24 as described above and a coil 30 is wrapped around the base 26 of the magnetic core 24 for generating an inductive magnetic field. A driver circuit 32 is connected to the coil 30 as well as to an external power source. According to the method, a mobile/portable device 12 is placed by a user in the groove 23 of the charging device 20 so that the power receiver 40 is located in the groove 23. The power receiver 40 is preferably as noted above and includes a receiver magnetic core 46 as well as a receiving coil 48 wrapped around the receiver magnetic core 46 for receiving an inductive current. The charging circuit 50 is connected to the coil 48 as well as to a battery 54 of the mobile/portable device 12. Here the mobile/portable device 12 can be positioned anywhere along the grove 23 and the battery 54 of the device 12 is charged via an inductive current generated in the receiving coil 48 from the charging device 20.

To the extent that a plurality of magnetic cores 24a-h, each associated with a separate coil 30 is provided, the method further includes the charging device 20 detecting the location of one or more power receivers 40 in the mobile/portable device 12 by powering the driver circuits 32 in turn and detecting a load on one or more of the driving circuits that is in proximity to a power receiver 40, and then providing power to the respective coil at the location detected.

According to the invention, the magnetic core 24 in the charging device 20 as well as the receiver magnetic core 46 in the power receiver 40 concentrate the magnetic field generated for inductive power transfer providing a more efficient power coupling co-efficient between the driver circuit 32 and the charging circuit 50. This has particular use in connection with tablet-style computing devices where the charging device 20 having the groove 23 allows for docking of the tablet-style computing device in a simple manner while still allowing full access to the display screen. This would also work in connection with other types of mobile/portable devices having a generally flat geometry where, for example a large portion of the surface area is occupied by a planar battery.

The charging system 10 according to the invention includes a charging device 20 having a groove 23 for receiving a mobile/portable device 12 for charging, wherein a magnetic core is located in the housing with the magnetic core having a base and two legs that are located around the groove 23. A coil 30 is wrapped around the base 26 and a driver circuit 32 is connected to the coil 30 as well as to an external power source. A power receiver 40 is located in a mobile/portable device 12 and can be placed in an area of the groove 23 in the charging device 20 with the positioning of the mobile/portable device 12 being relatively unconstrained since no specific alignment is required for charging. The power receiver 40 includes a receiver magnetic core 46 as well as a receiving coil 48 wrapped around the receiver magnetic core 46 for receiving an inductive current from the charging device 20. A charging circuit 50 is connected to the receiving coil 48 and adapted to be connected to the battery 54 of the mobile/portable device 12 for charging.

While the preferred embodiments of the invention have been described in detail above, those skilled in the art will recognize that the invention is not limited to the preferred embodiments described. Accordingly, the scope of the invention should only be construed based on the claims.

What is claimed is:

1. A wireless mobile/portable device charging system, comprising:
   a charging device having a housing with a groove for receiving the mobile/portable device for charging, a magnetic core located in the housing, the magnetic core has a base and two legs that are located around the groove, and a coil wrapped around the base, and a driver circuit is connected to the coil and to an external power source;
   a power receiver adapted to be located on a mobile/portable device in an area that is engagable in the groove of the charging device, the power receiver including a receiver magnetic core, a receiving coil wrapped around the receiving magnetic core for receiving an inductive current, and a charging circuit connected to the receiving coil and adapted to be connected to a battery of the mobile/portable device.

2. The charging system of claim 1, wherein longitudinal ends of the groove in the housing are open.

3. The charging system of claim 1, wherein a depth (d) of the groove in charging device encompasses a portion of the power receiver.

4. The charging system of claim 1, wherein the magnetic core comprises a plurality of magnetic cores located in the housing.

5. The charging system of claim 4, wherein at least two of which are located adjacent to one another.

6. The charging system of claim 4, wherein there is a plurality of the coils, with a separate one of the coils wrapped around the base of each of the magnetic cores.

7. The charging system of claim 6, wherein there are a plurality of the driver circuits and a separate one of the driver circuits is connected to each of the coils.

8. The charging system of claim 7, wherein the driver circuits are configured to detect a location of the power receiver based on a load being detected at a location of the power receiver in the groove.

9. The charging system of claim 4, wherein the magnetic cores have a width in a longitudinal direction of the groove that is greater than a diameter of the receiving core.

10. The charging system of claim 4, wherein the coil is wrapped around the bases of a plurality of the magnetic cores.

11. The charging system of claim 1, wherein the receiving magnetic core is a rod having a height that is less than a thickness of the mobile/portable device that is adapted to be positioned in the groove generally parallel to the base of the magnetic core.

12. The charging system of claim 1, further comprising the mobile/portable device, the receiver magnetic core being located in a bezel of the device.

13. The charging system of claim 12, wherein the bezel including a molded core holder having snap engagement tabs for holding the receiving magnetic core in position, and the receiving coil is wrapped around the core holder.

14. The charging system of claim 1, wherein a total clearance between both faces of the mobile/portable device and the groove is less than 0.1 inches.

15. The charging system of claim 12, wherein a plurality of the power receivers are located in the mobile/portable device, each of the power receivers is adapted to receive an inductive current from the charging device.

16. The charging system of claim 1, wherein a depth of the groove is less than a distance from a side of the mobile/portable device to a display screen on the mobile/portable device.

17. The charging system of claim 1, wherein the mobile/portable device is a tablet computer.

18. The charging system of claim 1, wherein the groove is adapted to receive a plurality of the mobile/portable devices for simultaneous charging of the mobile/portable devices.

19. A wireless charging device adapted to charge a mobile/portable device including an inductive power receiver, the charging device comprising:
   a housing that has a groove for receiving the mobile/portable device for charging;
   a magnetic core located in the housing, the magnetic core has a base and two legs that are located around the groove;
   a coil wrapped around the base of the magnetic core for generating an inductive magnetic field; and
   a driver circuit connected to the coil and to an external power source.

20. The charging device of claim 19, wherein longitudinal ends of the groove are open.

21. The charging device of claim 19, wherein the magnetic core comprises a plurality of magnetic cores.

22. The charging device of claim 21, wherein there is a plurality of the coils, with a separate one of the coils wrapped around the base of each of the magnetic cores.

23. The charging device of claim 22, wherein there are a plurality of the driver circuits and a separate one of the driver circuits is connected to each of the coils.

24. The charging system of claim 23, wherein the driver circuits are configured to detect a location of the power receiver based on a load being detected at a location of the power receiver in the groove.

25. The charging device of claim 24, wherein the magnetic cores have a width in a longitudinal direction of the groove that is greater than a diameter of the receiving core.

26. A method for wirelessly charging a mobile/portable device that includes an inductive power receiver, comprising:
provide a charging device having a housing that has a groove for receiving the mobile/portable device for charging, a magnetic core has a base and two legs is located around the groove, a coil is wrapped around the base of the magnetic core for generating an inductive magnetic field, and a driver circuit is connected to the coil and to an external power source;
placing a mobile/portable device including a power receiver in the groove of the charging device so that the power receiver is located in the groove, the power receiver including a receiver magnetic core, a receiving coil wrapped around the receiver magnetic core for receiving an inductive current, and a charging circuit connected to the receiving coil and to a battery of the mobile/portable device, the mobile/portable device being positionable anywhere along the groove; and
charging the battery of the device via an inductive charge generated in the receiving coil from the charging device.

27. The method of claim 26, wherein the magnetic core comprises a plurality of magnetic cores, and there are a plurality of the coils, with one a separate one of the coils wrapped around the base of each of the magnetic cores, and a plurality of the driver circuits, one connected to each of the coils, the method further comprising:

detecting a location of the power receiver based on a load on one of the driving circuits; and
providing power to the coil at the location detected.

28. A mobile/portable device adapted to be charged using a wireless charging device, the mobile/portable device comprising:
at least two power receivers located in a device housing, the power receivers each including a receiver magnetic core, and the power receivers being located along one or more edges of the housing;
a charging circuit connected to the at least two power receivers; and
a battery connected to the charging circuit.

29. The mobile/portable device according to claim 28, wherein the power receivers each include a receiving coil which is wrapped around the receiver magnetic core and is adapted to receiving an inductive current from the wireless charging device.

30. The mobile/portable device according to claim 28, wherein the device is a mobile telephone.

31. The mobile/portable device according to claim 28, wherein the device is a tablet-type computing device.

32. The mobile/portable device according to claim 28, wherein the at least one power receiver is located in a bezel around a periphery of the device housing.

33. The mobile/portable device according to claim 28, wherein a plurality of the power receivers are located in the device housing along at least two sides of the device housing to allow placement in the charging device in different orientations.

34. The mobile/portable device according to claim 28, wherein the receiver magnetic core in a molded core holder in the device housing having snap engagement tabs for holding the receiver magnetic core in position, and the receiving coil is wrapped around the core holder.

35. The mobile/portable device according to claim 28, wherein the power receivers are located along at least two edges of the housing.

\* \* \* \* \*